(12) United States Patent
Khorram

(10) Patent No.: US 8,768,284 B2
(45) Date of Patent: *Jul. 1, 2014

(54) RADIO FREQUENCY INTEGRATED CIRCUIT WITH NOISE IMMUNITY BORDER

(75) Inventor: Shahla Khorram, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1591 days.

This patent is subject to a terminal disclaimer.

(21) Appl. No.: 11/481,465

(22) Filed: Jul. 6, 2006

(65) Prior Publication Data

US 2006/0252402 A1 Nov. 9, 2006

Related U.S. Application Data

(63) Continuation of application No. 10/741,852, filed on Dec. 19, 2003, now Pat. No. 7,099,648.

(51) Int. Cl.
*H04B 1/28* (2006.01)
*H04B 1/00* (2006.01)
*H05K 1/14* (2006.01)
*H01L 25/00* (2006.01)

(52) U.S. Cl.
USPC ....... 455/333; 455/63.1; 455/67.13; 361/737; 361/748; 327/565

(58) Field of Classification Search
USPC .............. 455/63.1, 67.13, 78, 83, 114.1, 295, 455/296, 333, 550.1; 361/600, 679, 728, 361/736, 814; 327/551, 552, 564, 565
See application file for complete search history.

(56) References Cited

U.S. PATENT DOCUMENTS 5,594,383 A * 1/1997 Tamba .......................... 327/552
6,040,728 A * 3/2000 Nelson et al. ................. 327/565

* cited by examiner

*Primary Examiner* — Quochien B Vuong
(74) *Attorney, Agent, or Firm* — Garlick & Markison; Kevin L. Smith

(57) ABSTRACT

An integrated circuit includes an analog module, digital circuitry, and a border section. The analog module is susceptible to noise and is on a substrate of the integrated circuit. The digital circuitry generates the noise and is on the substrate. The border section is on the substrate and physically separates the analog module from the digital circuitry.

20 Claims, 5 Drawing Sheets

RFIC layout

RFIC layout

LPF 114 or 116 noise isolating circuitry 112 noise isolating circuitry 112

RADIO FREQUENCY INTEGRATED CIRCUIT WITH NOISE IMMUNITY BORDER

This patent application is claiming priority under 35 USC §120 as a continuing patent application of co-pending patent application entitled RADIO FREQUENCY INTEGRATED CIRCUIT LAYOUT WITH NOISE IMMUNITY BORDER, having a filing date of Dec. 19, 2003, and a Ser. No. 10/741,852, now issued as U.S. Pat. No. 7,099,648, on Aug. 29, 2006.

BACKGROUND OF THE INVENTION

1. Technical Field of the Invention

This invention relates generally to wireless communication systems and more particularly to radio frequency integrated circuits used within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

When the radio transceiver is implemented on a single integrated circuit, noise from the digital circuitry (e.g., the analog to digital converters, the digital to analog converters, the data recovery stage, the data modulation stage, etc.) can adversely affect the performance of the analog radio front-end (e.g., the low noise amplifier, the intermediate frequency stages, etc.). Accordingly, conventional IC layout practices are employed, which include separate power supplies for the analog and digital sections, separate ground connections for the analog and digital sections, and minimizing high frequency analog traces.

While these conventional IC layout practices help reduce the noise coupled from the digital section to the analog section, for high performance RF transceivers, the adverse affects of the noise from the digital section on the analog section is still too great. For instance, IEEE 802.11, in at least one subparagraph, requires a signal to noise (SNR) of −85 dBm when data is being transmitting at an 11 MPBS (megabits per second) rate. With this requirement, a 1-volt input signal must have less than approximately 20 micro-volts of noise. Without further noise suppressing techniques, the conventional IC layout practices fail to provide sufficient noise suppression and/or isolation.

Therefore a need exists for an integrated circuit, and in particular a radio frequency integrated circuit (RFIC), that has a high level of noise immunity between its analog sections and digital sections.

BRIEF SUMMARY OF THE INVENTION

The radio frequency integrated circuit (RFIC) having a noise immunity border of the present invention substantially meets these needs and others. In one embodiment, an RFIC includes a baseband processing module, a digital to analog converter, an analog to digital converter, a radio module, and a border section. The baseband processing module is operable to convert outbound data into outbound symbols based on an encoding protocol and to convert inbound symbols into inbound data based on the encoding protocol, wherein the baseband processing module is fabricated within a first portion of a substrate of the RFIC. The digital to analog converter is operably coupled to convert the outbound symbols into outbound baseband signals, wherein the digital to analog converter is fabricated within a second portion of the substrate. The analog to digital converter is operably coupled to convert inbound baseband signals into the inbound symbols, wherein the analog to digital converter is fabricated within a third portion of the substrate. The radio module is operably coupled to convert low noise outbound baseband signals into outbound radio frequency (RF) signals and to convert inbound RF signals into low noise inbound baseband signals, wherein the radio module is fabricated within a fourth portion of the substrate. The border section is fabricated on the substrate, wherein the border section physically separates the radio module from the baseband processing module, the digital to analog converter, and the analog to digital converter, wherein the border section includes noise suppression circuitry operably coupled to convert the outbound baseband signals into the low noise outbound baseband signals and to convert the low noise inbound baseband signals into the inbound baseband signals.

In another embodiment, an integrated circuit includes a digital processing module, an analog to digital converter, a digital to analog converter, an analog module, and a border section. The digital processing module is operable to process inbound digital signals and outbound digital signals, wherein the digital processing module is fabricated in a first portion of a substrate. The analog to digital converter is operably coupled to convert inbound analog signals into the inbound digital signals, wherein the analog to digital converter is fabricated within a second portion of the substrate. The digital to analog converter is operably coupled to convert the outbound digital signals into outbound analog signals, wherein the digital to analog converter is fabricated within a third portion of the substrate. The analog module is operably coupled to input the inbound analog signals and to output the outbound analog signals, wherein the analog module is fabricated within a fourth portion of the substrate. The border section is fabricated on the substrate, wherein the border section physically separates the analog module from the digital processing module, the analog to digital converter, and the digital to analog converter, wherein the border section includes noise suppression circuitry for exchanging the inbound analog signals between the analog module and the analog to digital converter and for exchanging the outbound analog signals between the analog module and the digital to analog converter.

DETAILED DESCRIPTION OF THE INVENTION

Figure 1:
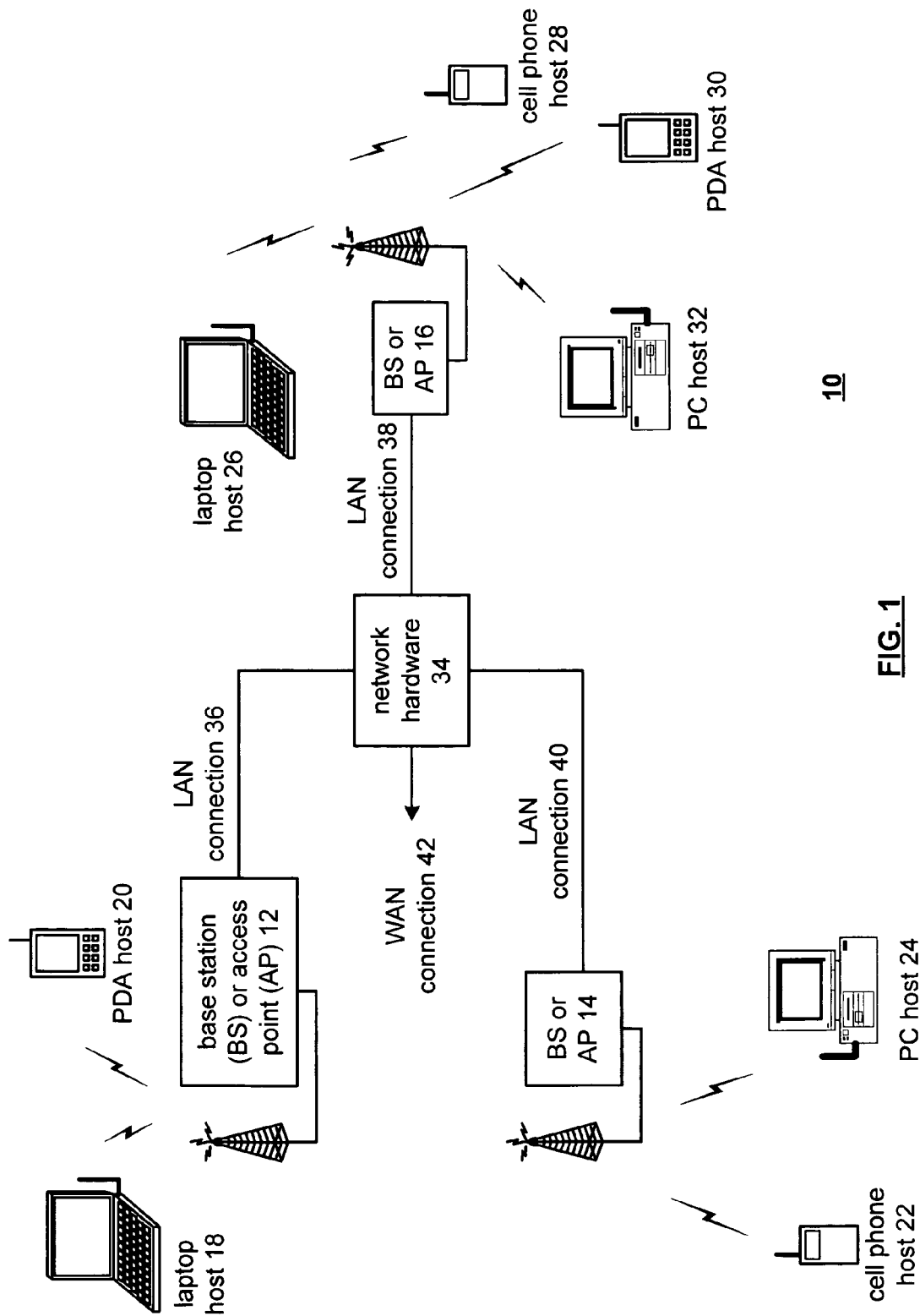
FIG. 1 is a schematic block diagram of a wireless communication system in accordance with an embodiment of the invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
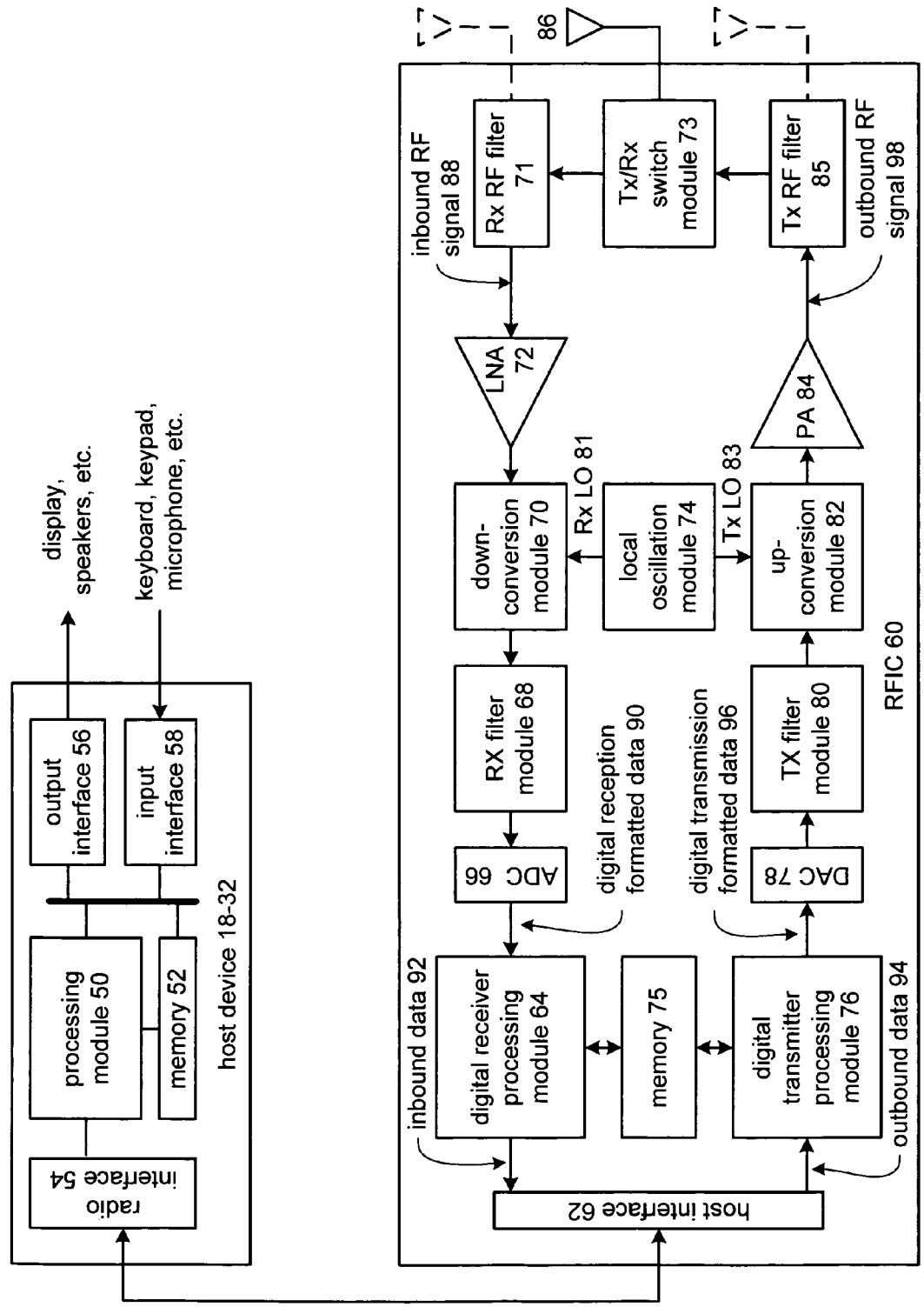
FIG. 2 is a schematic block diagram of a wireless communication device in accordance with an embodiment of the invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a receive (RX) filter module 68, an IF mixing down conversion stage 70, an RX RF filter 71, a low noise amplifier 72, a transmitter/receiver switch 73, a local oscillation module 74, memory 75, a digital transmitter processing module 76, a digital-to-analog converter 78, a transmit (TX) filter module 80, an IF mixing up conversion stage 82, a power amplifier 84, a TX RF filter 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively, in accordance with an encoding protocol proscribed by the corresponding standard. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The TX filter 80 filters the analog signal prior to providing it to the IF up conversion mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the TX RF filter 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the RX RF filter 71 via the Tx/Rx switch 73, where the RX RF filter 71 bandpass filters the inbound RF signal 88 and provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the RX filter module 68. The RX filter module 68 filters the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
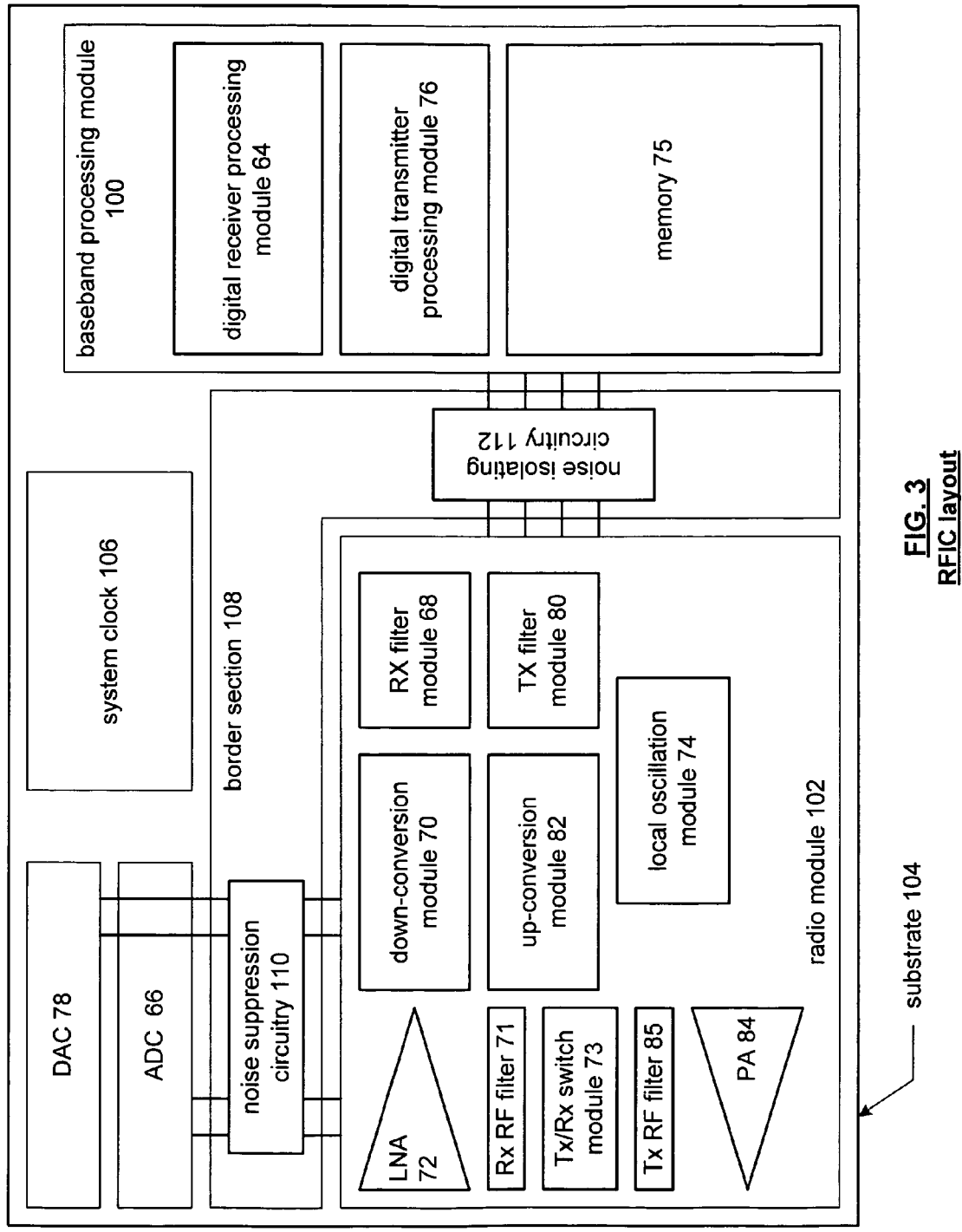
FIG. 3 is a diagram of an integrated circuit layout in accordance with an embodiment of the invention.

FIG. 3 is a diagram of a radio frequency integrated circuit (RFIC) layout. The integrated circuit is fabricated on a substrate 100 that is divided into a plurality of sections. The sections include a baseband processing module section 100, a radio module section 102, a digital-to-analog converter (DAC) section 78, an analog-to-digital converter (ADC) section 66, a system clock section 106 and a border section 108. Within the baseband processing module section 100 is fabricated the digital receiver module 64, the digital transmitter processing module 76 and memory 75. Fabricated within the radio module section 102 is a radio transmitter and/or radio receiver. The radio receiver includes the receiver RF filter 71, low noise amplifier 72, down conversion module 70, and receiver filter module 68. The transmitter section includes the transmitter RF filter 85, power amplifier 84, up-conversion module 82 and transmit filter module 80. The radio module 102 filter also includes a local oscillation module 74 and a transmit/receive (Tx/Rx) switch module 73. The border section 108 includes noise suppression circuitry 110 and noise isolating circuitry 112.

The border section 108 provides physical separation between the radio module 102 and the other sections 66, 78, 106, and 100 such that noise created by digital circuitry within the baseband processing module 100, system clock 106, digital-to-analog converter 78 and analog-to-digital converter 66 is substantially isolated from the radio module 100. The physical dimensions of the border section 108 may range from fractions of a micron to tens of microns depending on the desired level of isolation, available die area, et cetera.

As one of average skill in the art will appreciate, the radio frequency integrated circuit may include only a radio transmitter thus, the radio module 102 would only include the transmit RF filter 85, power amplifier 84, local oscillation module 74, up-conversion module 82 and transmit filter module 80. In addition, the baseband processing module 100 would only include the digital transmitter processing module 76. Conversely, the radio frequency IC may only include a radio receiver. In this instance, the radio module 102 would only include the receiver RF filter 71, low noise amplifier 72, down-conversion module 70, receiver filter module 68, and local oscillation module 74. In addition, the baseband processing module 100 would only include the digital receiver processing module 64. As one of average skill in the art will further appreciate, the integrated circuit layout may be applicable to any integrated circuit that includes an analog module that is susceptible to noise produced by a digital processing module, analog-to-digital converters and/or digital-to-analog converters. Accordingly, the analog module would be isolated from the digital circuitry via the border section 108. The border section would include the noise suppression circuitry 110 and/or noise isolating circuitry 112.

Figure 4:
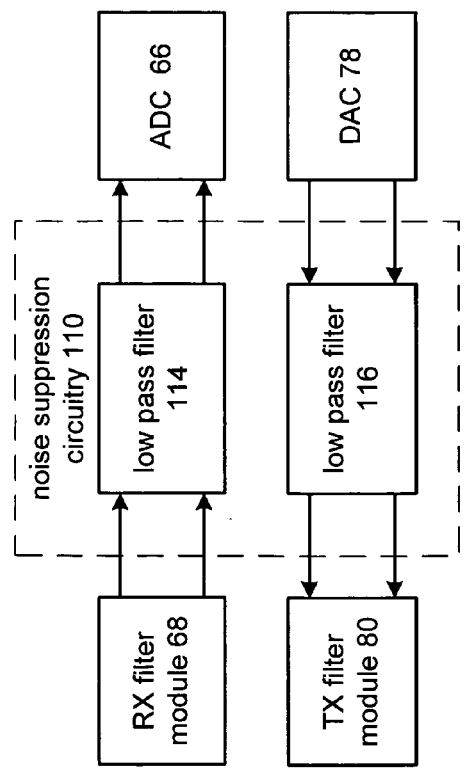
FIG. 4 is a schematic block diagram of noise suppression circuitry in accordance with an embodiment of the present invention.

FIG. 4 is a schematic block diagram of an embodiment of the noise suppression circuitry 110 that includes low pass filter 114 and low pass filter 116. In this embodiment, low pass filter 114 filters the output of the receiver filter module 68 prior to these signals being provided to the analog-to-digital converter 66. As such, the noise that may be generated within the analog-to-digital converter that would adversely affect the radio module is filtered via the low pass filter 114.

Similarly, low pass filter 116 filters the analog signals received from the digital-to-analog converter 78 prior to reception by the transmit filter module 80. As one of average skill in the art will appreciate, a direct conversion receiver and/or transmitter implementation of the radio module, the receive baseband signals and transmit baseband signals will each include an in-phase component and quadrature component. For each in-phase and quadrature component a separate low pass filter would be included within the noise suppression circuitry 110.

Figure 5:
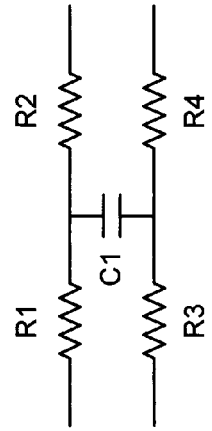
FIG. 5 is a schematic block diagram of an embodiment of low pass filter of the noise suppression circuitry of FIG. 4.

FIG. 5 is a schematic block diagram of one implementation of a low pass filter 114 or 116 that may be used within the noise suppression circuitry 110. As shown, the low pass filter includes a plurality of resistors and a capacitor. If the filter is tuned such that high frequency noise produced by the digital components is substantially attenuated and the baseband signal components are substantially passed without attenuation. As one of average skill in the art will appreciate, other embodiments of low pass filters may be used within the noise suppression circuitry 110. For instance, a single-ended embodiment may be produced.

Figure 6:
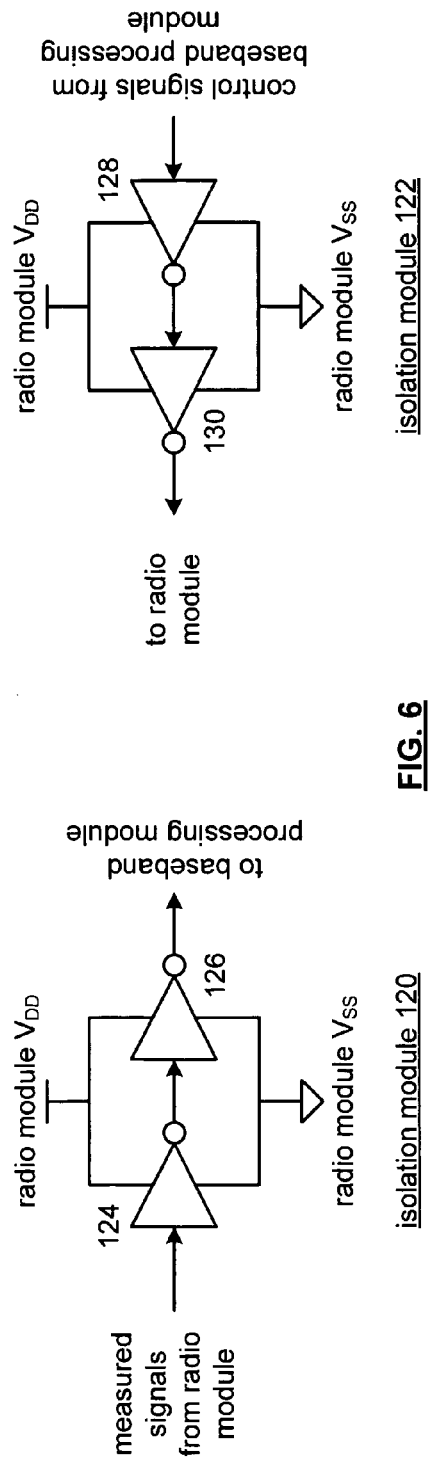
FIG. 6 is a schematic block diagram of noise isolating circuitry in accordance with an embodiment of the invention.

FIG. 6 is a schematic block diagram of an embodiment of the noise isolating circuitry 112. In this embodiment, the noise isolating circuitry 112 includes isolation module 120 and isolation module 122. Isolation module 120 includes two inverters, 124 and 126. Isolation module 122 includes two inverters 128 and 130.

Isolation module 120 is configured to isolate noise from being received by the radio module for signals provided from the radio module to the baseband processing module. In this instance, the power supply and ground for inverters 124 and 126 are provided from the radio module supply voltage ($V_{dd}$) and the radio module ground ($V_{ss}$). The measured signals from the radio module include, but are not limited to, received signal strength indication (RSSI), transmit signal strength indication (TSII), and other operating parameters of the radio.

Isolation module 122 provides noise isolation for control signals provided from the baseband processing module to the radio module. The inverters 128 and 130 of isolation module 122 are powered from the power supply and ground of radio module. The control signals provided from the baseband processing module to the radio include, but are not limited to, gain settings of the low noise amplifier, power amplifier, up-conversion module and down-conversion module, down-conversion calibration settings, receiver filter settings, transmit filter settings, up-conversion calibration settings.

Each of the isolation modules 120 and 122 isolate noise from the radio module from the baseband processing module via the inverters that are powered by the supply voltage and ground of the radio module. By utilizing the radio module power supply and ground, digital noise on the power supply that sources the baseband processing module 100 is isolated from the signals being provided to the radio module.

Figure 7:
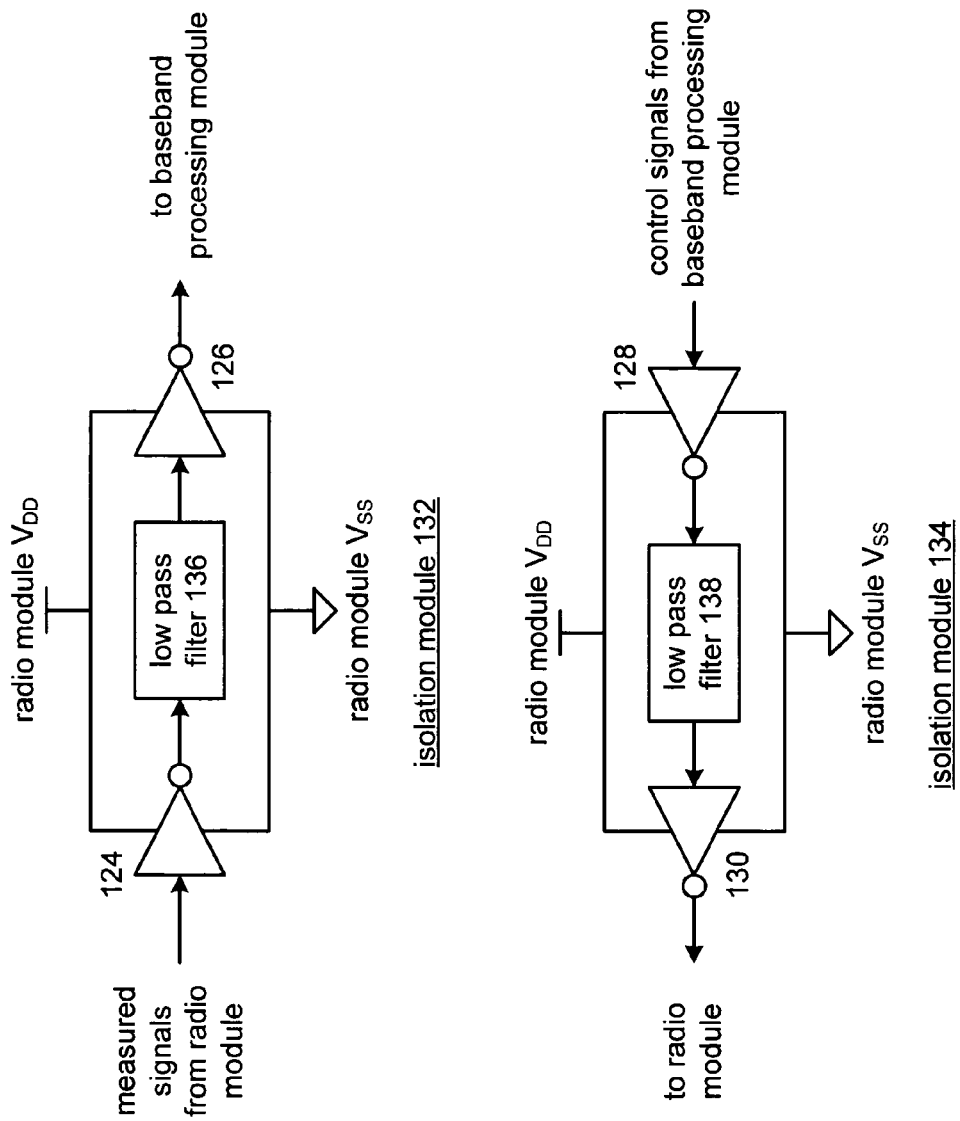
FIG. 7 is a schematic block diagram of noise isolating circuitry in accordance with another embodiment of the present invention.

FIG. 7 is a schematic block diagram of another embodiment of the noise isolating circuitry 112. In this embodiment, the noise isolating circuitry 112 includes isolation module 132 and isolation module 134. Isolation module 32 includes inverters 124 and 126 and a low pass filter 136 coupled there between. Isolation module 134 includes inverters 128 and 130 and a low pass filter 138 coupled there between. The low pass filters 136 and 138 provide filtering of the signals that are exchanged between the radio module and baseband processing module to further attenuate noise coupling from the baseband processing module to the radio module.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented an integrated circuit layout that provides noise isolation for sensitive analog circuits. Such noise isolation is achieved by including a border section that incorporates noise suppression and/or noise isolating circuitry. As one of average skill in the art will appreciate, other embodiments may be derived from the teaching of the present invention without deviating from the scope of the claims.

What is claimed is:

1. An integrated circuit comprises:
   an analog module that is susceptible to noise, wherein the analog module is on a substrate of the integrated circuit;
   digital circuitry that generates the noise, wherein the digital circuitry is on the substrate;
   a border section is fabricated on the substrate, wherein the border section configured to physically separate the analog module from the digital circuitry and operates to substantially isolate the analog module from the noise generated by the digital circuitry;

a baseband processing module on the substrate, wherein the border section further configured to physically separate the analog module from the baseband processing module and operates to substantially isolate the analog module from the noise generated by the baseband processing module; and noise isolating circuitry configured to exchange signals between the analog module and the baseband processing module.

2. The integrated circuit of claim 1, wherein the digital circuitry comprises at least one of:
   a digital processing module;
   an analog-to-digital converter; and
   a digital-to-analog converters.

3. The integrated circuit of claim 1, wherein the border section further comprises at least one of:
   noise suppression circuitry; and
   the noise isolating circuitry.

4. The integrated circuit of claim 3, wherein the noise suppression circuitry comprises:
   a low pass filter coupled to filter the outbound baseband signals to produce low noise outbound baseband signals.

5. The integrated circuit of claim 1, wherein the analog module comprises at least one of:
   a receiver radio frequency (RF) filter;
   a low noise amplifier; a down conversion module;
   a receiver filter module;
   a transmitter RF filter;
   a power amplifier;
   an up-conversion module; and
   transmit filter module.

6. An integrated circuit comprises:
   an analog to digital converter operably coupled to convert analog signals into digital signals, wherein the analog to digital converter is fabricated within a first portion of a substrate;
   an analog module operably coupled to process the analog signals, wherein the analog module is fabricated within a second portion of the substrate; and
   a border section fabricated on the substrate, wherein the border section physically separates the analog module from the analog to digital converter and the border section operates to substantially isolate the analog module from noise generated by the analog to digital converter, the border section further includes noise suppression circuitry for exchanging the analog signals between the analog module and the analog to digital converter;
   a baseband processing module on the substrate, wherein the border section is further configured to physically separate the analog module from the baseband processing module and operates to substantially isolate the analog module from noise generated by the baseband processing module; and
   noise isolating circuitry configured to exchange signals between the analog module and the baseband processing module.

7. The integrated circuit of claim 6, wherein the noise suppression circuitry of the border section comprises:
   a first low pass filter operably coupled to filter outbound analog signals from the analog to digital converter to produce low noise outbound analog signals; and
   a second low pass filter operably coupled to filter inbound analog signals sent to the analog to digital converter to produce low noise inbound analog signals.

8. The integrated circuit of claim 6, wherein the noise isolating circuitry comprises:
   a first isolation module including a plurality of inverters to isolate the noise from the received signals; and
   a second isolation module including another plurality of inverters to isolate the noise from the transmitted signals.

9. The integrated circuit of claim 6, wherein the signals are control signals.

10. The integrated circuit of claim 6, wherein the analog module comprises at least one of:
    a receiver radio frequency (RF) filter;
    a low noise amplifier;
    a down conversion module;
    a receiver filter module;
    a transmitter RF filter;
    a power amplifier;
    an up-conversion module; and
    transmit filter module.

11. The integrated circuit of claim 6, wherein the noise suppression circuitry comprises:
    a low pass filter coupled to filter the outbound baseband signals to produce low noise outbound baseband signals.

12. An integrated circuit comprises:
    a digital to analog converter operably coupled to convert digital signals into analog signals, wherein the digital to analog converter is fabricated within a first portion of a substrate;
    an analog module operably coupled to process the analog signals, wherein the analog module is fabricated within a second portion of the substrate;
    a border section fabricated on the substrate, wherein the border section physically separates the analog module from the digital to analog converter and the border section operates to substantially isolate the analog module from noise caused by the digital to analog converter, and further includes noise suppression circuitry for exchanging the analog signals between the analog module and the digital to analog converter;
    a baseband processing module fabricated within a third portion of the substrate and configured to receive signals from the analog module and transmit the signals to the analog module, wherein the border section physically separates the analog module from the baseband processing module; and
    noise isolating circuitry configured to exchange the signals between the analog module and the baseband processing module.

13. The integrated circuit of claim 12, wherein the noise suppression circuitry of the border section comprises:
    a first low pass filter operably coupled to filter outbound analog signals from the digital to analog converter to produce low noise outbound analog signals; and
    a second low pass filter operably coupled to filter inbound analog signals sent to the analog to digital converter to produce low noise inbound analog signals.

14. The integrated circuit of claim 13, wherein the first low pass filter comprises:
    a plurality of resistors; and
    a capacitor, wherein the capacitor is configured in a shunt relation when the outbound analog signals include an in-phase component and a quadrature component.

15. The integrated circuit of claim 13, wherein the second low pass filter comprises:
    a plurality of resistors; and a capacitor, wherein the capacitor is configured in a shunt relation when the inbound analog signals include an in-phase component and a quadrature component.

16. The integrated circuit of claim 12, wherein the analog module comprises at least one of:
 a receiver radio frequency (RF) filter;
 a low noise amplifier;
 a down-conversion module;
 a receiver filter module;
 a transmitter RF filter;
 a power amplifier;
 an up-conversion module; and
 transmit filter module.

17. The integrated circuit of claim 12, wherein the noise isolating circuitry comprises:
 a first isolation module including a plurality of inverters to isolate the noise from the received signals; and
 a second isolation module including another plurality of inverters to isolate the noise from the transmitted signals.

18. The integrated circuit of claim 12, wherein the signals are control signals.

19. The integrated circuit of claim 18, wherein the control signals comprise at least one of:
 a low noise amplifier gain setting;
 a power amplifier gain setting;
 an up-conversion module gain setting;
 a down-conversion gain setting;
 a down-conversion calibration setting;
 a receiver filter setter;
 a transmit filter setting; and
 an up-conversion calibration setting.

20. The integrated circuit of claim 12, wherein the noise suppression circuitry comprises:
 a low pass filter coupled to filter the outbound baseband signals to produce low noise outbound baseband signals.

* * * * *

UNITED STATES PATENT AND TRADEMARK OFFICE
CERTIFICATE OF CORRECTION

| | | |
|---|---|---|
| PATENT NO. | : 8,768,284 B2 | Page 1 of 1 |
| APPLICATION NO. | : 11/481465 | |
| DATED | : July 1, 2014 | |
| INVENTOR(S) | : Shahla Khorram | |

It is certified that error appears in the above-identified patent and that said Letters Patent is hereby corrected as shown below:

Claims

Col. 9, line 17, in claim 2: replace "converters" with --converter--

Signed and Sealed this
Third Day of November, 2015

Michelle K. Lee
*Director of the United States Patent and Trademark Office*